United States Patent [19]

Lewo

[11] Patent Number: 4,870,676
[45] Date of Patent: Sep. 26, 1989

[54] VEHICLE SUN VISOR TELEPHONE

[76] Inventor: Joe Lewo, P.O. Box N8913, Nassau, The Bahamas

[21] Appl. No.: 258,181

[22] Filed: Oct. 17, 1988

[51] Int. Cl.$^4$ .............................................. H04Q 7/04
[52] U.S. Cl. .................................... 379/58; 379/428; 379/110
[58] Field of Search .......................... 379/58, 110, 428

[56] References Cited

U.S. PATENT DOCUMENTS

| | | | |
|---|---|---|---|
| D. 294,495 | 3/1988 | Nissley | D12/191 |
| 4,056,696 | 11/1977 | Meyerle et al. | 379/58 |
| 4,646,344 | 2/1987 | Goldhorn et al. | 379/58 |
| 4,706,273 | 11/1987 | Spear et al. | 379/58 |
| 4,736,410 | 4/1988 | Nishida et al. | 379/354 |

*Primary Examiner*—Robert Lev
*Attorney, Agent, or Firm*—Alex Rhodes

[57] ABSTRACT

A vehicle cellular telephone is mounted on the side of a vehicle sun visor which is in clear view of a driver when the visor is in the downward shading position. The telephone has a memory for storing selected telephone numbers in accordance with numbers pre-assigned by a user and a dual system of controls for placing outside telephone calls. The dual controls for placing outside calls comprise a first linear array arranged across the lower edge portion of the telephone for "speed dialing" outgoing calls corresponding to the numbers stored by the user in the memory and a second square array of controls for the regular placement of outgoing calls. To "speed dial" an outgoing call, the pre-assigned number which corresponds to the telephone number of the outgoing call stored in the memory is entered into the linear array. To place an outgoing call in the regular manner the telephone number of the outgoing call is entered into the second array. There is also provided a linear array of operating controls above the first linear array and an alphanumeric display for displaying messages and the telephone numbers of outgoing calls.

7 Claims, 1 Drawing Sheet

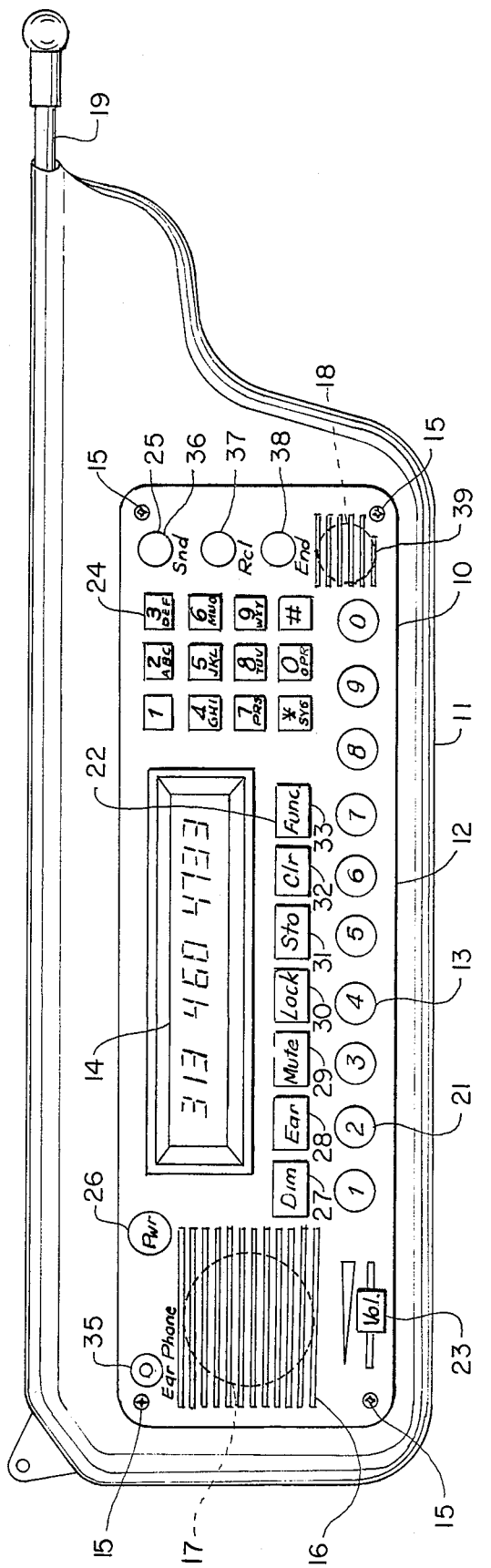
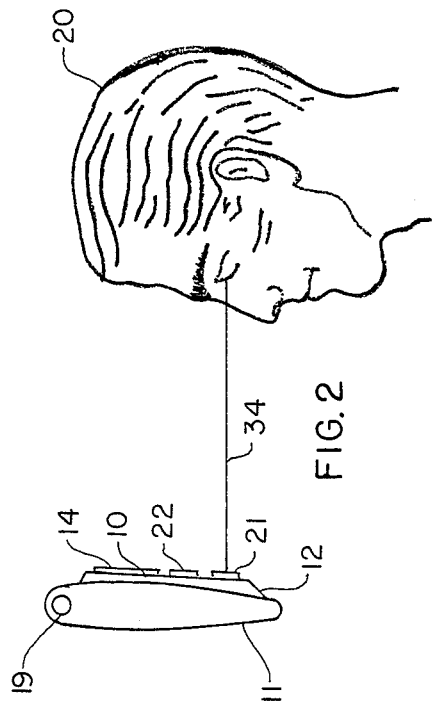

VEHICLE SUN VISOR TELEPHONE

BACKGROUND OF THE INVENTION

This invention relates to mobile telephones and more particularly to cellular telephones for motor vehicles. Expanded sales of vehicle cellular telephones, their utility and convenience are strong indicators that cellular telephones may soon become a major vehicle accessory.

Considerable concern exists that current designs and locations of vehicle telephones, namely, instrument panels and center arm rests, pose a safety risk because they distract a driver's attention from the road. Unless this concern is abated, the expanded usage of the vehicle cellular telephone may be arrested.

Spear et al, U.S. Pat. No. 4,706,273 addresses this concern by mounting a cellular telephone on the operator facing side of a rotatable vehicle sun visor in the upward non-shading position of the visor. Included in the controls which face the telephone's user in the upward non-shading position of the visor is a single linear array of numerically captioned controls for dialing an outgoing call. The linear array of controls is positioned adjacent to the shaft about which the visor is rotatable. There are no means in Spear for storing or speed dialing pre-selected telephone numbers.

Meyerle et al, U.S. Pat. No. 4,056,696 discloses a telephone handset and controls on the operator facing side of a vehicle sun visor when the visor is in a downward shading position.

Included in the controls facing the telephone's user in the shading position, is a double row of numerically captioned controls for dialing the telephone number of an outgoing call. Like Spear, there are no means in Meyerle for storing or speed dialing pre-selected telephone numbers.

SUMMARY OF THE INVENTION

The present invention is directed to a vehicle sun visor cellular telephone having controls which are positioned in the driver's field of vision and do not divert his attention from the road. One important feature of the invention is a "one touch" speed dialing system for placing calls to pre-selected telephone numbers. One aspect of the "one touch" speed dialing system is that the controls for placing pre-selected numbers comprise a linear array of large liberally spaced apart controls at the lowermost edge portion of the telephone on the side of the sun visor which is in confronting relationship to the telephone's user when the visor is in a downward shading position. Another aspect of the "one touch" speed dialing system is that the linear array of "one touch" speed dialing controls is substantially aligned with the horizontal ray of the driver's field of vision. This aspect permits a driver to quickly place pre-selected outgoing calls without diverting his attention from the road.

Another feature, in addition to the "speed dialing" system, is that the operating controls for the telephone are arranged in a second linear array across the visor near and above the first linear array.

Another feature, in addition to the foregoing features, is a square array of numbered controls for the regular placement of outgoing calls. This arrangement provides controls which drivers are most familiar with and has been used for many years for residential and office telephones.

There is also provided within the driver's field of vision and directly above the two linear arrays, a large alphanumeric display for prominently displaying the telephone numbers of outgoing calls and messages such as "LOCKED" when the telephone is electronically locked by the user of the telephone.

It is a primary object of the present invention to provide a sun visor mounted cellular telephone having a convenient, easy to operate arrangement of controls which does not divert a vehicle driver's attention from the road.

It is another object, in addition to the foregoing object, to provide in a vehicle sun visor telephone a "one touch" speed dialing system for placing pre-selected outgoing calls.

The foregoing objects and features, together with other objects, features, and benefits of the invention will be apparent from the ensuing description which discloses the invention in detail in accordance with the best mode contemplated in carrying out the invention.

BRIEF DESCRIPTION OF THE DRAWINGS

FIG. 1 is a front elevation view of a motor vehicle sun visor containing a cellular telephone in the downward shading position of the visor.

FIG. 2 is a right side view of the sun visor shown in FIG. 1. and a driver.

DETAILED DESCRIPTION OF THE PREFERRED EMBODIMENT

Referring now to the drawings, wherein like numerals designate like and corresponding parts throughout the several views, the particular embodiment disclosed in FIGS. 1 and 2, for purposes of illustrating the invention, comprises: a conventional type vehicle sun visor 11 which is selectively adjustable to the downward shading position wherein the visor 11 is in a substantially vertical position away from the vehicle's headliner and to a substantially horizontal upward non-shading position (not shown) wherein the sun visor 11 is adjacent to the vehicle's headliner, a cellular telephone 10 mounted in the sun visor 11 having electronic means for sending and receiving telephone calls; a face plate 12 for mounting the telephone's controls 13, controls 13 mounted in the face plate 12 for operating the telephone 12; a means 14 mounted in the face plate 12 for displaying telephone numbers and messages to the user of the telephone; a ringing means (not shown) for signalling incoming calls, threaded fasteners 15 or other suitable means for mounting the cellular telephone 10 in the sun visor 11; means for illuminating the controls (not shown); a plurality of elongated apertures 16 at the left end portion of the telephone 10, a speaker 17 and microphone 18 mounted behind the apertures 16 and 39, respectively, in the face plate 12; a jack 35 for connecting an auxiliary earphone to the telephone; and a shaft 19 attached to the visor 11 for rotatably mounting the visor in the vehicle. Alternatively, the speaker 17 can be externally mounted in the interior of the vehicle (not shown) or an existing speaker, such as a radio speaker, can be used.

As shown in FIGS. 1 and 2, the face plate 12 and operating controls 13 are positioned on the side of the sun visor 11 which confronts the driver 20 when the visor 11 is substantially vertical in the downward shading position. The controls 13 comprise a lateral linear array of numerically captioned controls 21 across the lowermost edge portion of the sun visor 11 for "one touch" speed dialing of pre-selected outgoing calls; a second lateral linear array of controls 22 above and in parallel relationship to the first linear array 21 for designated operating functions of the telephone 10; an alphanumeric display 14 above the array of operating controls 22 for displaying messages and numbers of outgoing calls; a control 23 for regulating the volume of incoming calls positioned adjacent to the left end portion of said first lateral array 21; a square array of alphanumeric captioned controls 24 positioned adjacent to the right end portion of the alphanumeric display 14 for the regular dialing of outgoing telephone calls; a vertical array 25 of controls adjacent to the right end portion of the square array for redialing previously dialed telephone numbers and transmitting, and ending telephone calls, and a control 26 for supplying power to the telephone 10 positioned adjacent to the left end portion of the alphanumeric display 14.

The operating controls in the second linear array comprise a dimmer ("DIM") control 27 for dimming said illuminating means; an earphone ("EAR") control 28 for routing incoming messages to an earphone (not shown) connected to the earphone jack 35, a mute ("MUTE") control 29 for preventing the other party from hearing the user of the telephone, a lock ("LOCK") control 30 for preventing others from using the telephone 10, a store ("STO") control 31 for storing the pre-selected telephone numbers for the "one touch" speed dialing system, a delete ("CLR") control 32 for deleting stored pre-selected telephone numbers from the memory; and a function ("FUNC") control 33 for activating special functions of the telephone.

A major feature of the invention is the "one touch" speed dialing system for outgoing calls. With reference to FIGS. 1 and 2, it will be observed that the linear array of "one touch" speed dialing controls 21 at the lower edge portion of the telephone 10 is substantially aligned with the horizontal line of sight 34 of the driver 20 of the vehicle. This arrangement permits the rapid placement of pre-selected calls without diversion of the driver's attention from the road. Moreover, as shown in FIG. 1, the "one touch" controls are liberally sized and separated to prevent the diversion of the driver's attention from the road during the placement of a telephone call.

The manner of using the cellular telephone 10 is as follows. The telephone 10 is locked by pressing the "LOCK" control 30 and unlocked by entering a three digit secret code. When the telephone 10 is locked, the word "LOCKED" is displayed in the alphanumeric display 14. To place a call with the "one touch" speed dialing system, a single control ("0" through "9") in the lowermost linear array 21 which corresponds to a telephone number stored in the memory of the telephone is pressed. Other calls are placed by entering their complete telephone numbers in the square array of controls 24 at the right end portion of the telephone 10 followed by the pressing of the control 36 marked "SEND". Calls are received by pressing the control marked "SEND" after receiving a ring.

Calls are ended by pressing the "END" control 38 or automatically 5 seconds after the termination of the call by the other party. The last outgoing call is redialed by pressing the control 36 marked "SEND". The telephone numbers of outgoing calls are displayed on the alphanumeric display 14 after the telephone numbers are dialed.

Telephone numbers are stored in the memory by entering the numbers in the square array 24; thereafter depressing the store ("STO") number 31; and lastly depressing the control in the linear array 21 to which the stored number has been assigned. The single "0" through "9" controls are reserved for speed dialing whereas the two digit combinations of these controls are used for storing and recalling other telephone numbers. To clear numbers in the display 14, the control 32 marked "CLR" is depressed.

From the foregoing, it will be appreciated that the present invention provides a motor vehicle cellular telephone mounted in a sun visor which is convenient, easy to use and does not divert a driver's attention from the road while operating the telephone.

Although but a single embodiment of my invention has been illustrated and described, it will be understood that other embodiments can be provided by changes in the material, size, shape and arrangement of its parts without departing from the spirit thereof.

I claim:

1. In a motor vehicle having a headliner positioned above the driver of the vehicle and a sun visor in front of the driver which is selectively adjustable to a shading position wherein the visor is in a substantially vertical position away from the headliner and to a non-shading position wherein the sun visor is in a substantially horizontal position adjacent to the headliner, a mobile telephone mounted on the side of the visor which confronts the driver when the sun visor is in said shading position, said telephone having a memory for selectively storing telephone numbers in accordance with numbers pre-assigned by a user and a dual system of operating controls for dialing outgoing telephone calls, said dual system of controls comprising a first lateral linear array of controls for "speed dialing" an outgoing call by entering the pre-assigned number which corresponds to the telephone number of the outgoing call stored in the memory into the linear array and a second array for the regular dialing of an outgoing call by entering the telephone number of the call in the second array.

2. The vehicle telephone recited in claim 1 wherein the lateral linear array of controls for the "one touch" speed dialing of outgoing telephone calls is positioned at the lowermost edge portion of the telephone.

3. The vehicle telephone recited in claim 1 further comprising a second lateral linear array of operating controls above and in parallel relationship to said first linear array.

4. The vehicle telephone recited in claim 1 wherein said second array of controls is a square array of alphanumeric captioned controls above said first linear array for regularly placing outgoing telephone calls.

5. The vehicle telephone recited in claim 1 further comprising a lateral alphanumeric display above said first linear array for displaying operating messages and the numbers of outgoing telephone calls.

6. In a motor vehicle having a headliner positioned above the driver of the vehicle and a sun visor in front of the driver which is selectively adjustable to a shading position wherein the visor is in a substantially vertical position away from the headliner and to a non-shading position wherein the sun visor is in a substantially horizontal position adjacent to the headliner, a mobile telephone mounted on the side of the visor which confronts the driver when the sun visor is in said shading position, said telephone having a memory for selectively storing telephone numbers in accordance with numbers pre-assigned by a user; a dual system of operating controls for dialing outgoing telephone calls, said dual system of controls comprising a first lateral linear array of controls for "speed dialing" an outgoing call by entering the pre-assigned number which corresponds to the telephone number of the outgoing call stored in the memory into the linear array and a second array for the regular dialing of an outgoing call by entering the telephone number of the call in the second array; and a lateral linear array of operating controls above and in parallel relationship to said first linear array.

7. In a motor vehicle having a headliner positioned above the driver of the vehicle and a sun visor in front of the driver which is selectively adjustable to a shading position wherein the visor is in a substantially vertical position away from the headliner and to a non-shading position wherein the sun visor is in a substantially horizontal position adjacent to the headliner, a mobile telephone mounted on the side of the visor which confronts the driver when the sun visor is in said shading position, said telephone having a memory for selectively storing telephone numbers in accordance with numbers pre-assigned by a user; a dual system of operating controls for dialing outgoing telephone calls, said dual system of controls comprising a first lateral linear array of controls for "speed dialing" an outgoing call by entering the pre-assigned number which corresponds to the telephone number of the outgoing call stored in the memory into the linear array and a second array for the regular dialing of an outgoing call by entering the telephone number of the call in the second array; a lateral linear array of operating controls above and in parallel relationship to said first linear array; and an alphanumeric display for displaying messages and the telephone numbers of outgoing calls.

* * * * *